(12) United States Patent
Cafri

(10) Patent No.: US 8,608,208 B2
(45) Date of Patent: Dec. 17, 2013

(54) PIPE COUPLING ASSEMBLY

(75) Inventor: Hagay Cafri, Bet-Hashmonay (IL)

(73) Assignee: Heliofocus Ltd., Ness Ziona (IL)

( * ) Notice: Subject to any disclaimer, the term of this patent is extended or adjusted under 35 U.S.C. 154(b) by 127 days.

(21) Appl. No.: 13/219,732

(22) Filed: Aug. 29, 2011

(65) Prior Publication Data

US 2012/0049510 A1    Mar. 1, 2012

Related U.S. Application Data

(60) Provisional application No. 61/378,593, filed on Aug. 31, 2010.

(51) Int. Cl.
*F16L 27/00* (2006.01)

(52) U.S. Cl.
USPC .............. 285/272; 285/123.3; 285/904

(58) Field of Classification Search
USPC ........... 285/272, 276, 278, 275, 123.1, 123.3, 285/904
See application file for complete search history.

(56) References Cited

U.S. PATENT DOCUMENTS

| | | | | |
|---|---|---|---|---|
| 1,389,768 A * | 9/1921 | McFarland | ................. | 285/123.3 |
| 2,384,281 A * | 9/1945 | Carter | ........................... | 285/276 |
| 2,794,659 A * | 6/1957 | Bily | .............................. | 285/276 |
| 2,820,650 A * | 1/1958 | Leopold | ..................... | 285/121.3 |
| 2,910,309 A * | 10/1959 | Snyder et al. | ................. | 285/276 |
| 3,017,202 A * | 1/1962 | Swaney | ...................... | 285/121.3 |
| 3,379,027 A | 4/1968 | Mowell et al. | | |
| 3,411,526 A * | 11/1968 | Schaefer | ...................... | 285/273 |
| 3,441,295 A * | 4/1969 | Josef | .......................... | 285/123.3 |
| 4,022,498 A | 5/1977 | Jameson | | |
| 4,154,446 A * | 5/1979 | Usry | ............................. | 285/41 |
| 4,164,166 A | 8/1979 | Stubbs | | |
| 4,227,866 A | 10/1980 | Stubbs | | |
| 4,262,483 A | 4/1981 | DeGeus | | |
| 4,278,076 A | 7/1981 | Hopper | | |
| 4,323,268 A * | 4/1982 | Wilson | ........................ | 285/190 |
| 4,413,617 A | 11/1983 | Dunlap et al. | | |
| 4,844,514 A * | 7/1989 | Chauvin et al. | ............... | 285/276 |
| 5,555,878 A | 9/1996 | Sparkman | | |
| 5,797,415 A | 8/1998 | Nicholson et al. | | |
| 6,134,893 A * | 10/2000 | Bonn | ........................... | 285/904 |
| 6,623,043 B1 * | 9/2003 | Pollack | ......................... | 285/904 |
| 6,851,724 B2 * | 2/2005 | Pittman, II | ..................... | 285/272 |
| 7,284,771 B2 * | 10/2007 | Baumann et al. | .......... | 285/123.3 |
| 7,328,921 B1 * | 2/2008 | Miciukiewicz | ............... | 285/275 |
| 7,338,091 B2 * | 3/2008 | Ghilardi | ........................ | 285/272 |
| 7,341,283 B2 | 3/2008 | Moses et al. | | |
| 2006/0230690 A1 | 10/2006 | Dunick | | |
| 2012/0133126 A1 * | 5/2012 | Izumi et al. | ................... | 285/272 |

FOREIGN PATENT DOCUMENTS

WO    WO 2010011151    1/2010

* cited by examiner

*Primary Examiner* — David E Bochna

(74) *Attorney, Agent, or Firm* — Daniel J. Swirsky; AlphaPatent Associates Ltd.

(57) ABSTRACT

A pipe coupling assembly, including a first portion having a first channel therethrough and a second channel substantially coaxial with and separated from the first channel, and a second portion rotatably connected to the first portion, wherein the second portion has a first channel substantially aligned with the first channel of the first portion and a second channel substantially aligned with the second channel of the first portion.

21 Claims, 13 Drawing Sheets

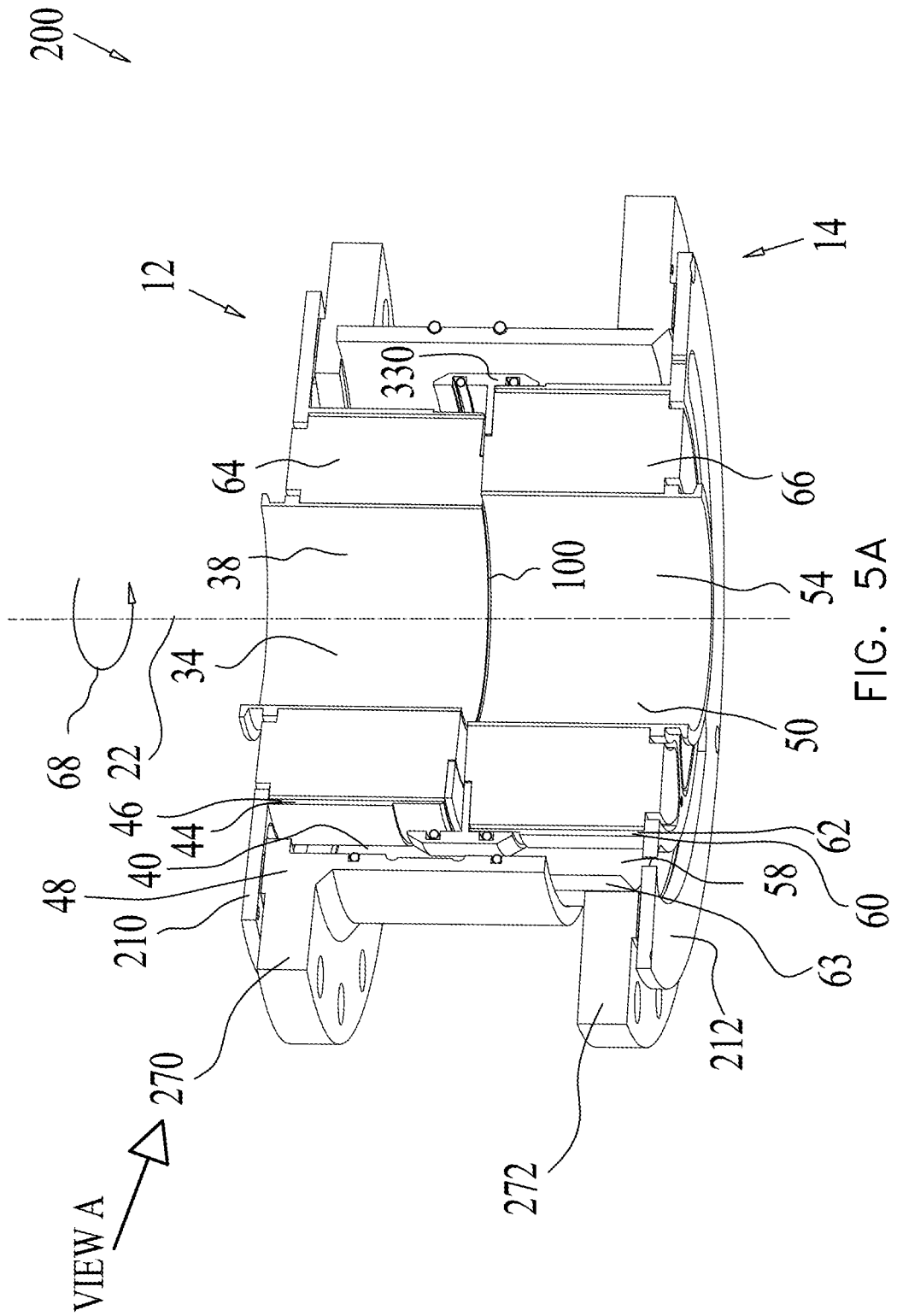

PIPE COUPLING ASSEMBLY

CROSS-REFERENCE TO RELATED APPLICATIONS

Applicant hereby claims priority from U.S. Provisional Application No. 61/378,593, filed on Aug. 31, 2010, titled "Pipe Coupling Assembly," which is incorporated herein by reference in its entirety.

FIELD OF THE INVENTION

The present invention relates generally to pipe coupling assemblies.

BACKGROUND OF THE INVENTION

Fluid transfer systems may comprise a plurality of pipes designed for flow of fluid therein.

The plurality of pipes may be designed with a first, inner fluid channel, surrounded by a second, outer fluid channel. The inner fluid channel and the outer fluid channel may be generally coaxially aligned therebetween. A fluid may flow within the inner fluid channel and the outer fluid channel.

In some systems the plurality of pipes may comprise a first pipe configured to rotate about a second pipe.

SUMMARY OF THE INVENTION

There is thus provided in accordance with an embodiment of the present invention a pipe coupling assembly, including a first portion having a first channel therethrough and a second channel substantially coaxial with and separated from the first channel, and a second portion rotatably connected to the first portion, wherein the second portion has a first channel substantially aligned with the first channel of the first portion and a second channel substantially aligned with the second channel of the first portion.

In accordance with an embodiment of the invention the pipe coupling assembly further includes a sealing member for preventing leakage of a fluid intermediate the first channels of the first and second portion to the second channels of the first and second portion. Accordingly, the sealing member is positioned within the second channel of the first portion and/or second channel of the second portion. Additionally, the sealing member includes an O-ring. Moreover, the sealing member includes a lip seal. Furthermore, a gap is defined intermediate the first portion and the second portion, the gap includes an inclined portion.

In accordance with another embodiment of the invention the second portion is rotatably connected to the first portion utilizing a ball bearing type of mechanism. Additionally, the ball bearing type of mechanism is provided with a lubricant. Moreover, at least one rolling element is provided for rotatable connection of the second portion to the first portion.

In accordance with yet another embodiment of the invention thermal insulation is provided intermediate the first channels of the first and second portion and the second channels of the first and second portion. Accordingly, the pipe coupling assembly further includes a supporting element provided to secure the thermal insulation to the pipe coupling assembly. Additionally, the supporting element includes a cord.

In accordance with a further embodiment of the invention the pipe coupling assembly is configured with at least one aperture for allowing fluid communication between the pipe coupling assembly and a channel of a pipe assembly. Accordingly, the least one aperture includes a plurality of apertures formed in a crescent-like shape. Moreover, the plurality of apertures includes a plurality of outer apertures, the plurality of outer apertures are annually arranged about a plurality of inner apertures.

In accordance with yet a further embodiment of the invention the outer apertures are asymmetrically arranged about the inner apertures. Accordingly, radial arms are defined intermediate at least one pair of the plurality of apertures.

In accordance with still a further embodiment of the invention the pipe coupling assembly couples at least one pipe assembly to another pipe assembly. Accordingly, the pipe assembly includes a first channel and a second channel coaxial with and separated from the first channel, the pipe coupling assembly being configured for alignment of the first channel of the pipe coupling assembly with the first channel of the pipe assembly. Additionally, the pipe coupling assembly is connected to a pipe assembly at one end thereof and another the pipe coupling assembly is connected to the pipe assembly at another end thereof.

There is thus provided in accordance with another embodiment of the present invention a pipe coupling assembly, including a first portion having a first central bore and a first channel separated from and peripheral to the first central bore, and a second portion having a second central bore and a second channel separated from and peripheral to the second central bore, wherein the first bore is aligned with the second bore, the first channel is aligned with the second channel, and the first portion is rotatably connected to the second portion.

BRIEF DESCRIPTION OF THE DRAWINGS

The present invention will be understood and appreciated more fully from the following detailed description, taken in conjunction with the drawings in which:

FIG. 5A is a simplified partially pictorial, partially sectional illustration taken along lines VA-VA in FIG. 3, showing the embodiment of FIG. 4A;

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Figure 1:
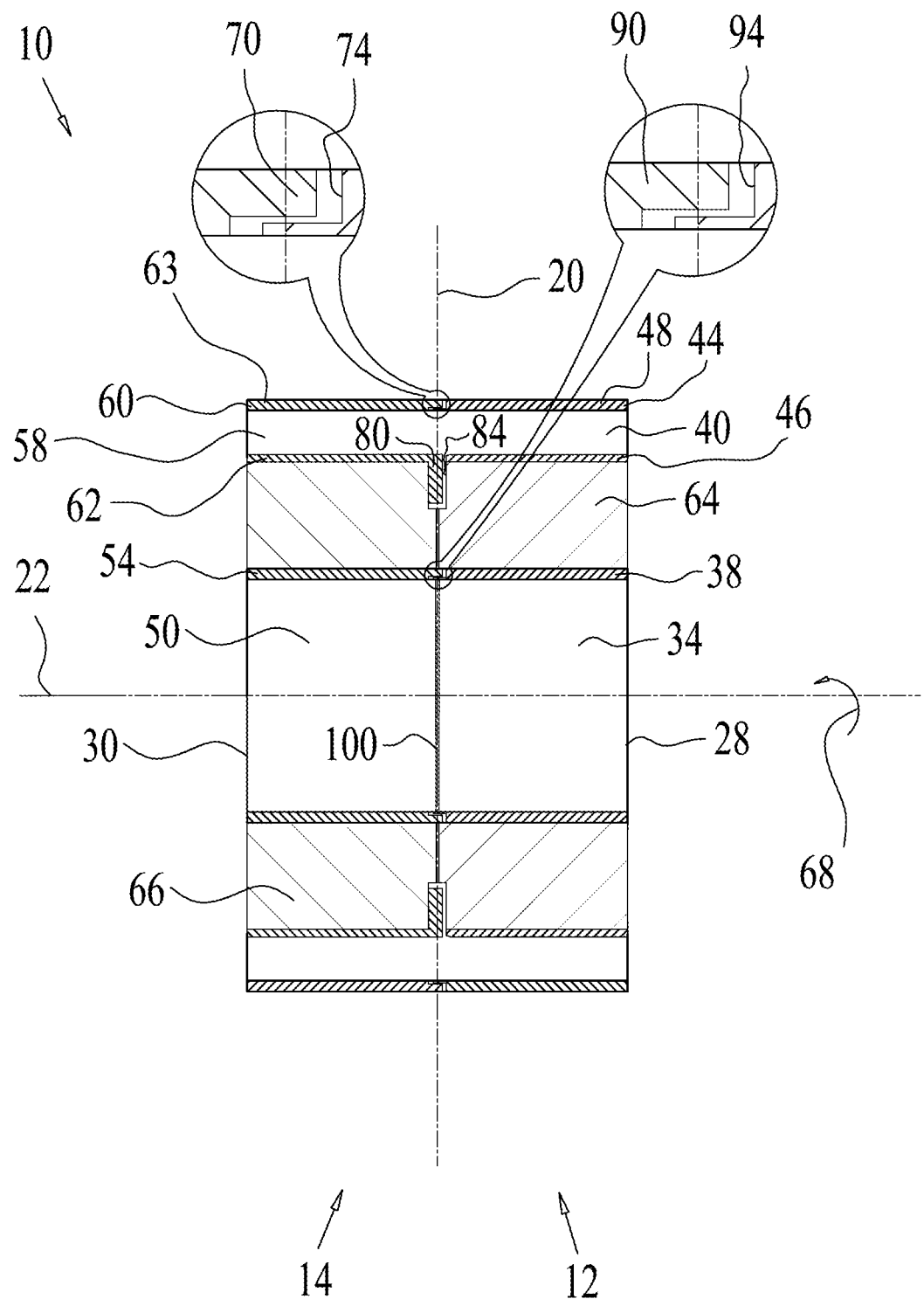
FIG. 1 is a simplified pictorial illustration of a pipe coupling assembly constructed and operative in accordance with an embodiment of the present invention.

Reference is now made to FIG. 1, which is a simplified pictorial illustration of a pipe coupling assembly constructed and operative in accordance with an embodiment of the present invention. As seen in FIG. 1, pipe coupling assembly 10 may comprise a first portion 12 rotatably connected to a second portion 14.

The first portion 12 may extend from a first generally central axis 20 along a generally longitudinal axis 22 of the pipe coupling assembly 10 to a first surface 28 of the pipe coupling assembly 10.

The first portion 12 may be adjacent to the second portion 14. The second portion 14 may extend from the first generally central axis 20 along the generally longitudinal axis 22 to a second surface 30 of the pipe coupling assembly 10.

The first portion 12 may comprise a first channel 34. The first channel 34 may be an inner channel comprising a thoroughgoing bore. The first channel 34 may allow a fluid to flow therethrough. The first channel 34 may be defined by a conduit 38. The conduit 38 may be formed as a cylindrical tube, as seen in FIG. 1, or as a conical tube or in any other suitable configuration. The first portion 12 may comprise a second channel 40. The second channel 40 may be an outer channel and may allow a fluid to flow therethrough. The second channel 40 may be defined by a conduit 44. The conduit 44 may be configured with two cylindrical, substantially coaxial tubes including an inner cylindrical tube defining a first wall 46 thereof, which may be surrounded by an outer cylindrical tube defining a second wall 48 thereof. The conduit 44 may be configured in any suitable manner, such as a conical tube or in any other suitable configuration. The second channel 40 may be separated from and peripheral to the first channel 34. Additionally, the second channel 40 may be substantially coaxially aligned with the first channel 34.

The second central portion 14 may comprise a first channel 50. The first channel 50 may be an inner channel comprising a thoroughgoing bore. The first channel 50 may allow a fluid to flow therethrough. The first channel 50 may be defined by a conduit 54. The conduit 54 may be formed as a cylindrical tube, as seen in FIG. 1, or as a conical tube or in any other suitable configuration. The second portion 14 may comprise a second channel 58. The second channel 58 may be an outer channel and may allow a fluid to flow therethrough. The second channel 58 may be defined by a conduit 60. The conduit 60 may be configured with two cylindrical, substantially coaxial tubes including an inner cylindrical tube defining a first wall 62 thereof, which may be surrounded by an outer cylindrical tube defining a second wall 63 thereof. The conduit 60 may be configured in any suitable manner, such as a conical tube or in any other suitable configuration. The second channel 58 may be separated from and peripheral to the first channel 50. Additionally, the second channel 58 may be substantially coaxially aligned with the first channel 50.

As seen in FIG. 1, the first channel 34 may be aligned with the first channel 50 and the second channel 40 may be aligned with the second channel 58.

The conduit 38 of the first portion 12 and the conduit 54 of the second portion 14 may be formed of any suitable material, typically a material adapted to withstand relatively high temperatures, such as a ceramic material, an insulating material, a metal, such as carbon steel, stainless steel or aluminum, for example. The conduit 44 of the first portion 12 and the conduit 60 of the second portion 14 may be formed of any suitable material, such as a ceramic material, an insulating material or a metal, such as carbon steel, stainless steel or aluminum, for example.

Thermal insulation 64 may be introduced between the first channel 34 and the second channel 40 of the first portion 12 so as to minimize heat exchange between a fluid flowing within the first channel 34 and the fluid flowing within the second channel 40.

Thermal insulation 66 may be introduced between the first channel 50 and the second channel 58 of the second portion 14 so as to minimize heat exchange between a fluid flowing within the first channel 50 and the fluid flowing within the second channel 58.

Thermal insulation 64 of the first portion 12 and thermal insulation 66 of the second portion 14 may be aligned therebetween.

Thermal insulation 64 and 66 may be formed of any suitable material such as a ceramic material and/or a microporous insulation material, for example. The thermal insulation 64 or 66 may be shaped in any suitable manner, such as a single unit, as shown in FIG. 1, or as a plurality of insulating components (not shown).

It is noted that the conduit 38 of portion 12 and the conduit 54 of portion 14 may be obviated and the channels 34 and 50 may be defined by respective insulation 64 and 66, of respective first portion 12 and second portion 14. The first wall 46 of conduit 44 of portion 12 and the first wall 62 of conduit 60 of portion 14 may be obviated and the second channels 40 and 58 may be defined by respective insulation 64 and 66 of respective first portion 12 and second portion 14. Alternatively, the channels 34 and 40 of the first portion 12 or the channels 50 and 58 of the second portion 14 may be defined by any suitable element, such as a sheath (not shown) lining the insulation 64 or 66, for example.

The second portion 14 may rotate about the first portion 12 about the longitudinal axis 22 in the orientation of an arrow 68. Additionally, the first portion 12 may rotate about the second portion 14, around the longitudinal axis 22.

The second portion 14 may be rotatably engaged with the first portion 12 in any suitable manner. For example, as seen in FIG. 1, a circumferential protrusion 70 may be formed within the second wall 63 of conduit 60 of second portion 14. The circumferential protrusion 70 may be engaged with a corresponding circumferential recess 74 formed partially within the second wall 63 and partially within the second wall 48 of conduit 44 of first portion 12.

Similarly, a circumferential protrusion 80 may be formed within the first wall 62 of conduit 60 of second portion 14. The circumferential protrusion 80 may be engaged with a corresponding circumferential recess 84 formed partially within the first wall 62 of conduit 60 and partially within the first wall 46 of conduit 44.

A circumferential protrusion 90 may be formed within conduit 54 of second portion 14. The circumferential protrusion 90 may be engaged with a corresponding circumferential recess 94 formed partially within conduit 54 and partially within conduit 38.

The circumferential protrusions 70, 80 and 90 may be designed to slide within respective corresponding circumferential recess 74, 84 and 94, thereby allowing the first portion 12 and second portion 14 to rotate relative to each other. Furthermore, the substantially coaxial alignment of the first channels 34 and 50 with second channels 40 and 58 may be maintained, while the first portion 12 is rotated relative to the second portion 14, or vise versa.

It is appreciated that the protrusions 70, 80 and 90 may be formed in any suitable location within the pipe coupling assembly 10. For example, the protrusions 70, 80 and 90 may be formed within the respective second wall 48, first wall 46 and conduit 38 of first portion 12. The corresponding recess 74 may be formed partially within the second wall 63 and partially within the second wall 48 of respective second portion 14 and first portion 12. The corresponding recess 84 may be formed partially within the first wall 62 and partially within the first wall 46 of respective second portion 14 and first portion 12. The corresponding recess 94 may be formed partially within the conduit 54 and partially within the conduit 38 of respective second portion 14 and first portion 12.

A sealing member (not shown) may be provided between the first channels 34 and 50 and the second channels 40 and 58 so as to prevent leakage of fluid intermediate the first channels 34 and 50 and the second channels 40 and 58, typically via a gap 100 formed between first portion 12 and second portion 14. Examples of such sealing members will be described in reference to FIGS. 3-9.

The pipe coupling assembly 10 may be utilized to adjoin together a first and second pipe assembly and allow the first or second pipe assembly to rotate about the corresponding pipe assembly, as will be further described in reference to FIG. 2 hereinbelow.

Figure 2:
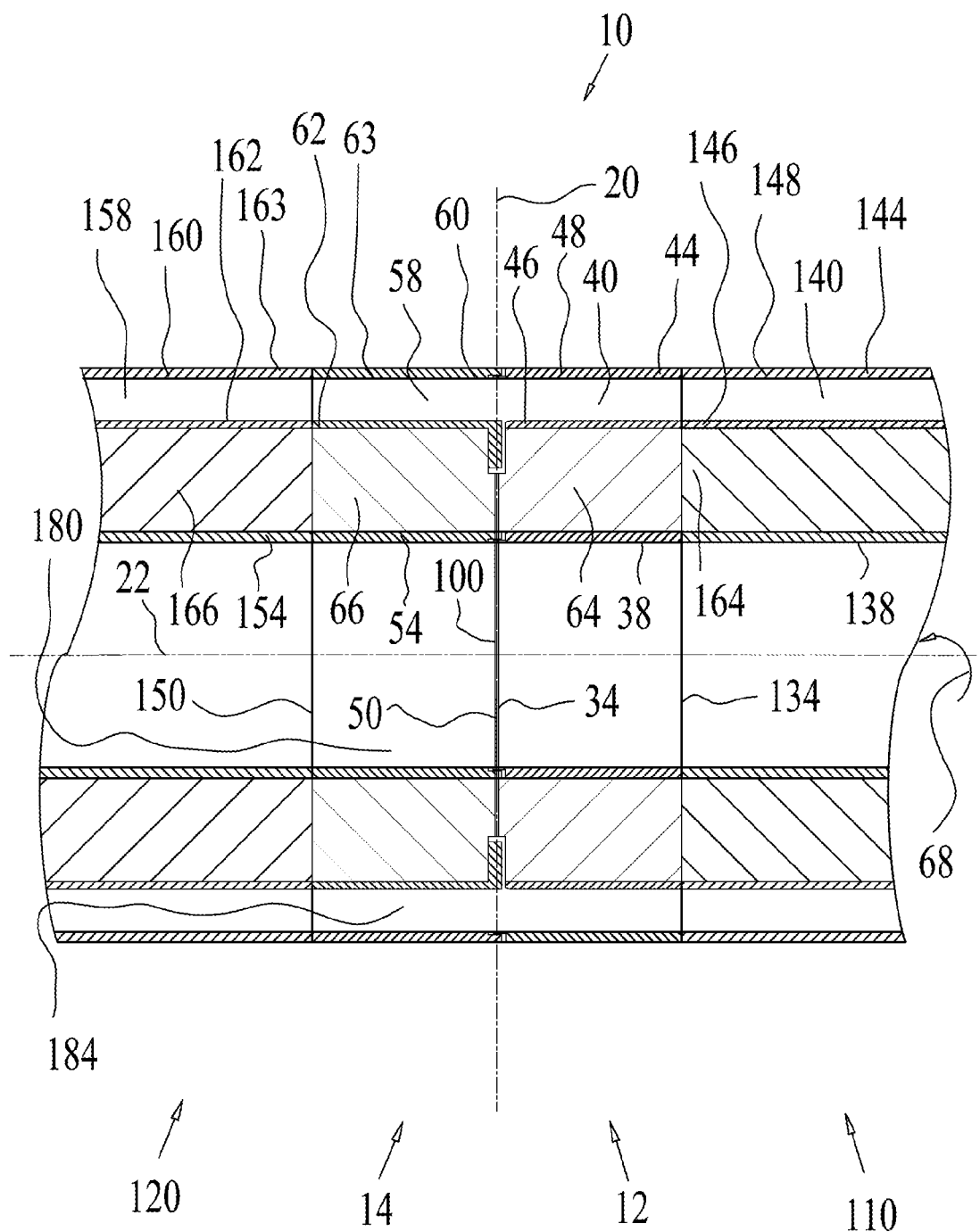
FIG. 2 is a simplified sectional illustration showing the pipe coupling assembly of FIG. 1 adjoining pipe assemblies therein.

Reference is now made to FIG. 2, which is a simplified sectional illustration showing the pipe coupling assembly 10 adjoining a first and second pipe assembly thereto. As seen in FIG. 2, a first pipe assembly 110 may be coupled to the first portion 12 of the pipe coupling assembly 10 in any suitable manner. For example, first pipe assembly 110 may be adhered to the first portion 12 by epoxy or any other suitable means. Additionally, the first pipe assembly 110 may be welded to the first portion 12 or fixed to the first portion 12 in any suitable manner, for example.

A second pipe assembly 120 may be coupled to the second portion 14 of the pipe coupling assembly 10 in any suitable manner. For example, second pipe assembly 120 may be adhered to the second portion 14 by epoxy or any other suitable means. Additionally, the second pipe assembly 120 may be welded to the second portion 14 or fixed to the second portion 14 in any suitable manner, for example.

The first pipe assembly 110 may comprise a first channel 134. The first channel 134 may be an inner channel comprising a thoroughgoing bore. The first channel 134 may allow a fluid to flow therethrough. The first channel 134 may be defined by a conduit 138. The conduit 138 may be formed as a cylindrical tube, as seen in FIG. 2, or as a conical tube or in any other suitable configuration. The first pipe assembly 110 may comprise a second channel 140. The second channel 140 may be an outer channel and may allow a fluid to flow therethrough. The second channel 140 may be defined by a conduit 144. The conduit 144 may be configured with two cylindrical, substantially coaxial tubes including an inner cylindrical tube defining a first wall 146 thereof, which may be surrounded by an outer cylindrical tube defining a second wall 148 thereof.

The conduit 144 may be configured in any suitable manner, such as a conical tube or in any other suitable configuration. The second channel 140 may be separated from and peripheral to the first channel 134. Additionally, the second channel 140 may be substantially coaxially aligned with the first channel 134.

The second pipe assembly 120 may comprise a first channel 150. The first channel 150 may be an inner channel comprising a thoroughgoing bore. The first channel 150 may allow a fluid to flow therethrough. The first channel 150 may be defined by a conduit 154. The conduit 154 may be formed as a cylindrical tube, as seen in FIG. 2, or as a conical tube or in any other suitable configuration. The second pipe assembly 120 may comprise a second channel 158. The second channel 158 may be an outer channel and may allow a fluid to flow therethrough. The second channel 158 may be defined by a conduit 160. The conduit 160 may be configured with two cylindrical, substantially coaxial tubes including an inner cylindrical tube defining a first wall 162 thereof, which may be surrounded by an outer cylindrical tube defining a second wall 163 thereof. The conduit 160 may be configured in any suitable manner, such as a conical tube or in any other suitable configuration. The second channel 158 may be separated from and peripheral to the first channel 150. Additionally, the second channel 158 may be substantially coaxially aligned with the first channel 150.

As seen in FIG. 2, the first channel 134 of the first pipe assembly 110 may be aligned with the first channel 34 of the first portion 12 and the second channel 140 of the first pipe assembly 110 may be aligned with the second channel 40 of the first portion 12.

The first channel 150 of the second pipe assembly 120 may be aligned with the first channel 50 of the second portion 14 and the second channel 158 of the second pipe assembly 120 may be aligned with the second channel 58 of the second portion 14.

As seen in FIG. 2, the first channels 134 and 150 may be substantially coaxially aligned with the second channels 140 and 158.

The conduit 138 of the first pipe assembly 110 and the conduit 154 of the second pipe assembly 120 may be formed of any suitable material, typically a material adapted to withstand relatively high temperatures, such as a ceramic material, an insulating material, a metal, such as carbon steel, stainless steel or aluminum, for example. The conduit 144 of the first pipe assembly 110 and the conduit 160 of the second pipe assembly 120 may be formed of any suitable material, such as a ceramic material, an insulating material or a metal, such as carbon steel, stainless steel or aluminum, for example.

Thermal insulation 164 may be introduced between the first channel 134 and the second channel 140 of the first pipe assembly 110 so as to minimize heat exchange between a fluid flowing within the first channel 134 and the fluid flowing within the second channel 140.

Thermal insulation 166 may be introduced between the first channel 150 and the second channel 158 of the second pipe assembly 120 so as to minimize heat exchange between a fluid flowing within the first channel 150 and the fluid flowing within the second channel 158.

Thermal insulation 164 of the first pipe assembly 110 and thermal insulation 166 of the second pipe assembly 120 may be aligned with the thermal insulation 64 and 66.

Thermal insulation 164 and 166 may be formed of any suitable material such as a ceramic material and/or microporous insulation, for example.

It is noted that the conduit 138 of first pipe assembly 110 and the conduit 154 of second pipe assembly 120 may be obviated and the channels 134 and 150 may be defined by respective insulation 164 and 166, of respective first pipe assembly 110 and second pipe assembly 120. The first wall 146 of conduit 144 of first pipe assembly 110 and the first wall 162 of conduit 160 of second pipe assembly 120 may be obviated and the second channels 140 and 158 may be defined by respective insulation 164 and 166 of respective first pipe assembly 110 and second pipe assembly 120. Alternatively, the channels 134 and 150 of the first pipe assembly 110 and the channels 140 or 158 of the second pipe assembly 120 may be defined by any suitable element, such as a sheath (not shown) lining the insulation 164 or 166, for example.

The first channels 138, 38, 50 and 150 of respective first pipe assembly 110, first portion 12, second portion 14 and second pipe assembly 120 may define a generally continues first fluid channel 180. The second channels 140, 40, 58 and 158 of respective first pipe assembly 110, first portion 12, second portion 14 and second pipe assembly 120 may define a generally continues second fluid channel 184.

In a non-limiting example, fluid flowing within the first fluid channel 180 is typically hotter than the fluid flowing within the second fluid channel 184. For example, the fluid flowing within the first fluid channel 180 may have a temperature in a range of approximately 25-1000° C. and the fluid flowing within the second fluid channel 184 may have a temperature in a range of 25-250° C.

As seen in FIG. 2, the pipe coupling assembly 10 couples and adjoins the first and second pipe assemblies 110 and 120. The second pipe assembly 120 may rotate relative to the first pipe assembly 110 as the second portion 14 rotates relative to the first portion 12. Similarly, the first pipe assembly 110 may rotate relative to the second pipe assembly 120 as the first portion 12 rotates relative to the second portion 14.

It is noted that a first fluid may flow within the first fluid channel 180 and a different, second fluid may flow within the second fluid channel 184. Alternatively, the same fluid may flow within the first fluid channel 180 and the second fluid channel 184.

It is appreciated that any suitable element may be provided intermediate the pipe coupling assembly 10 and the first pipe assembly 110 and/or the second pipe assembly 120 to ensure continues fluid flow via the first fluid channel 180 and/or via the second fluid channel 184. For example, gaskets (not shown) may be provided intermediate the pipe coupling assembly 10 and the first pipe assembly 110 and/or the second pipe assembly 120.

It is further appreciated that the pipe coupling assembly 10 may be utilized to adjoin any pipes or pipe assemblies configured in any suitable manner.

Additionally, the pipe coupling assembly may couple at least one pipe assembly to another pipe assembly.

An example of a system utilizing a pipe coupling assembly to adjoin pipe assemblies will be described in reference to FIG. 10, hereinbelow.

Figure 3:
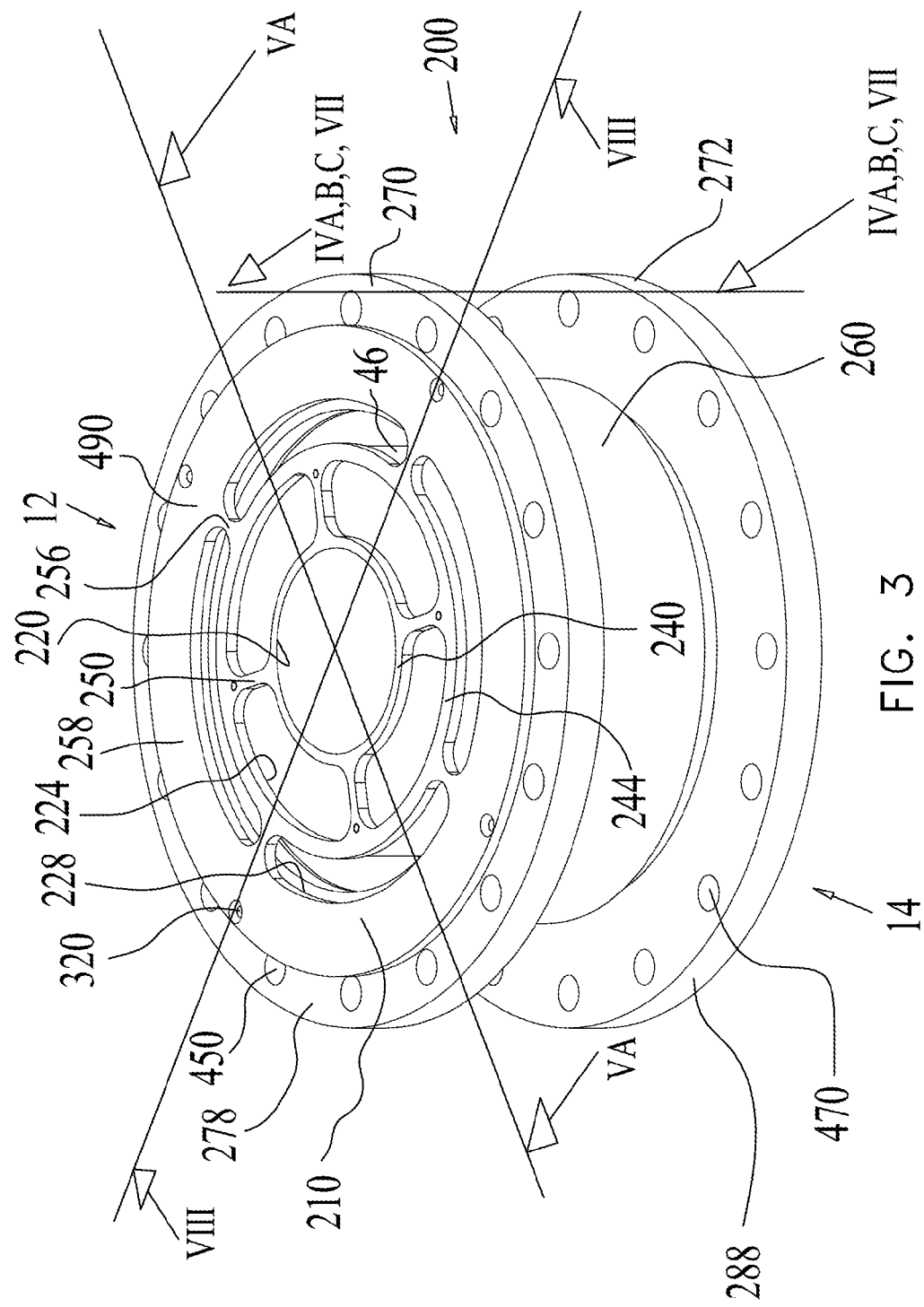
FIG. 3 is a simplified pictorial illustration of a pipe coupling assembly constructed and operative in accordance with another embodiment of the present invention.
Figure 4A:
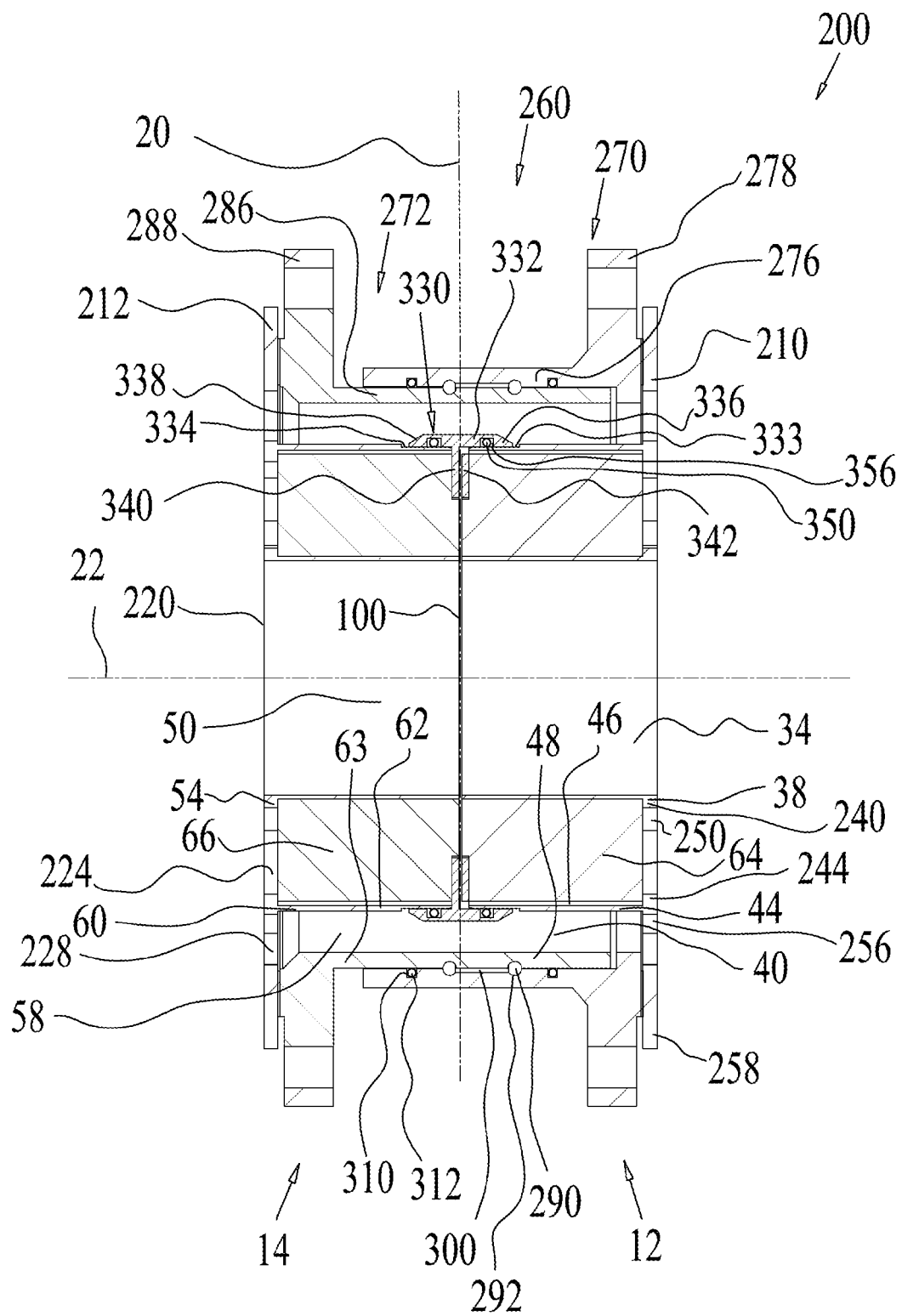
FIG. 4A is a simplified sectional illustration taken along lines IVA-IVA in FIG. 3.
Figure 4B:
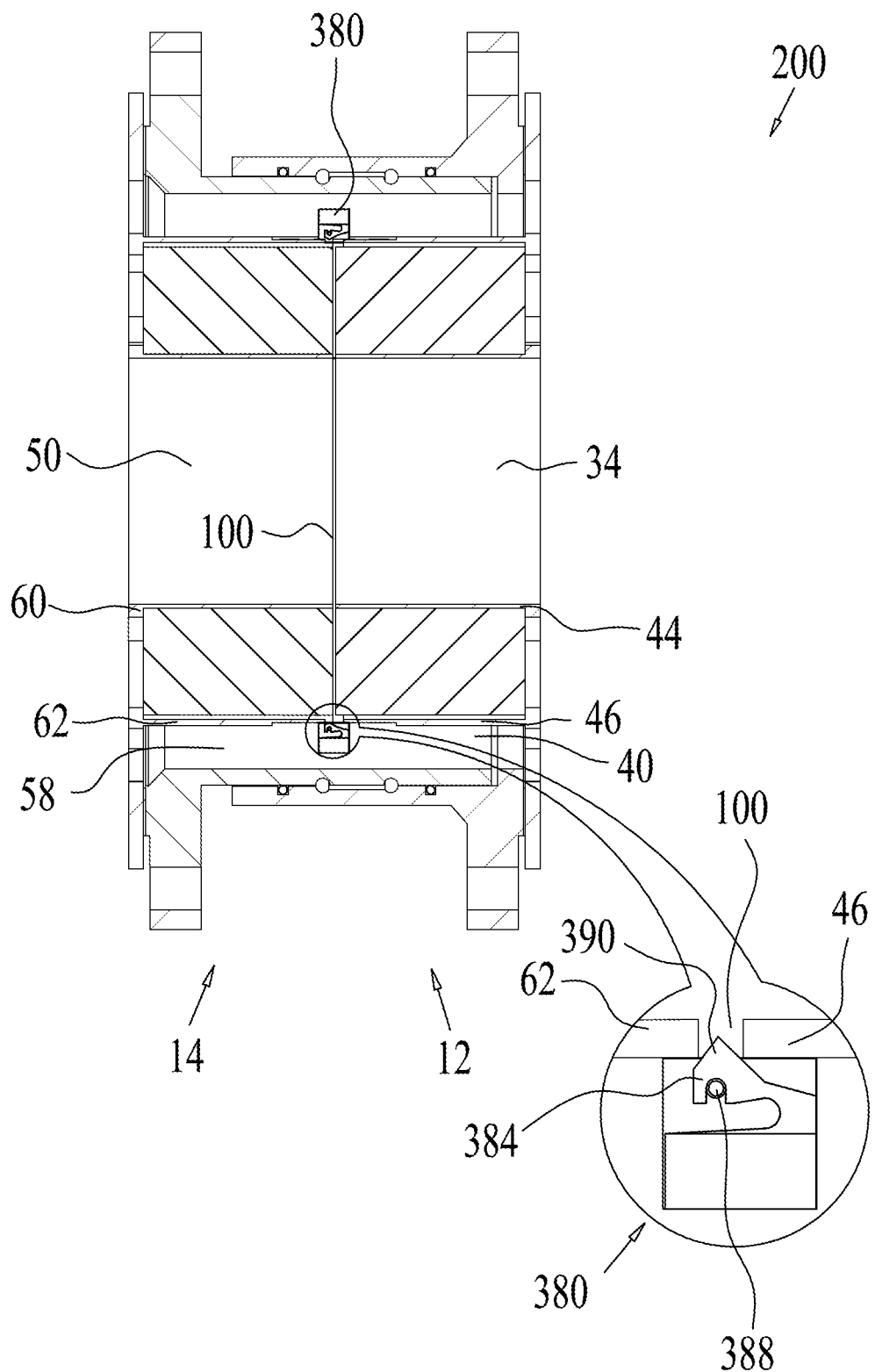
FIG. 4B is a simplified sectional illustration taken along lines IVB-IVB in FIG. 3 showing an alternative embodiment of a sealing member.
Figure 4C:
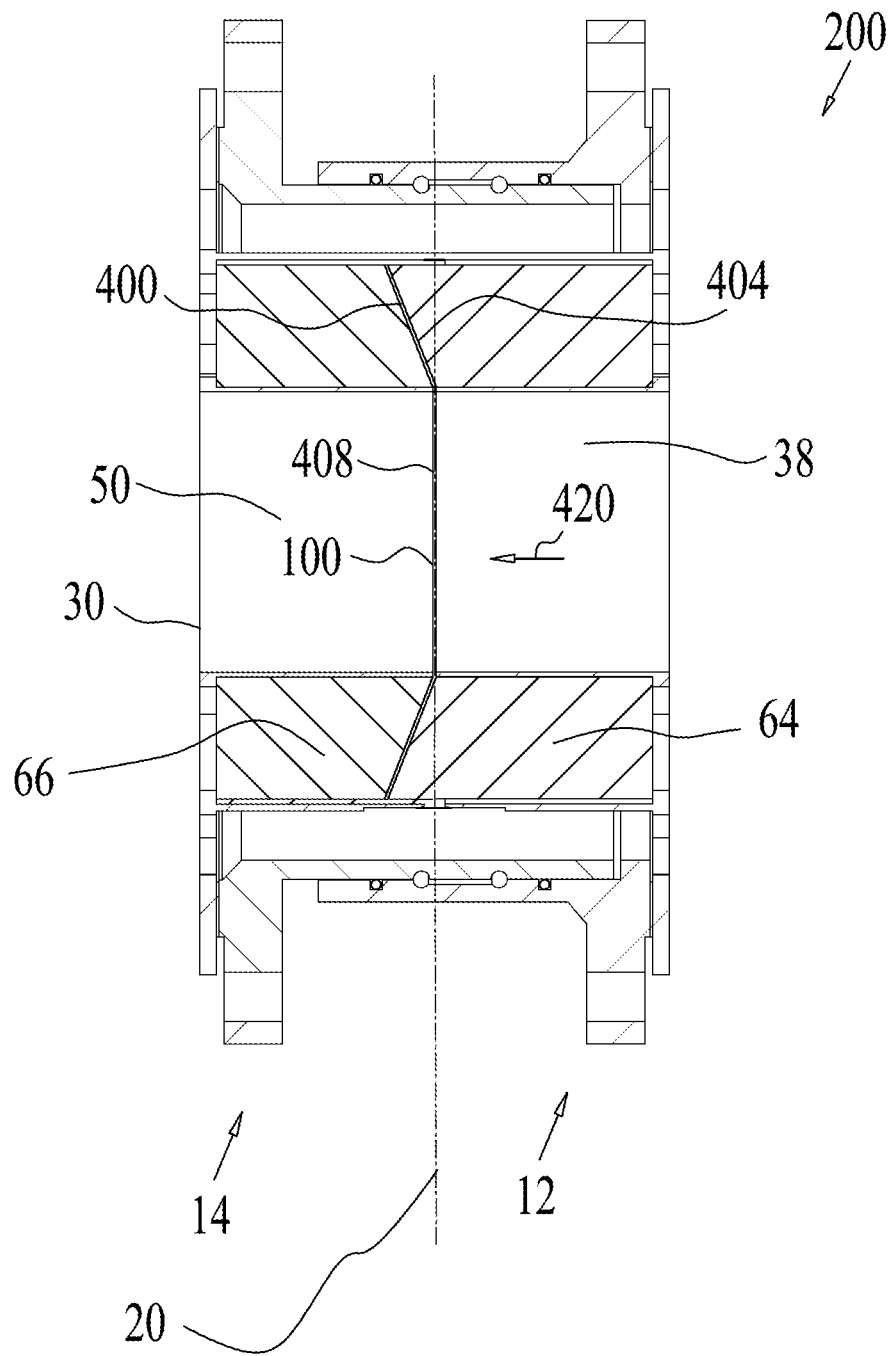
FIG. 4C is a simplified sectional illustration taken along lines IVC-IVC in FIG. 3 showing another alternative embodiment of a sealing member.
Figure 5B:
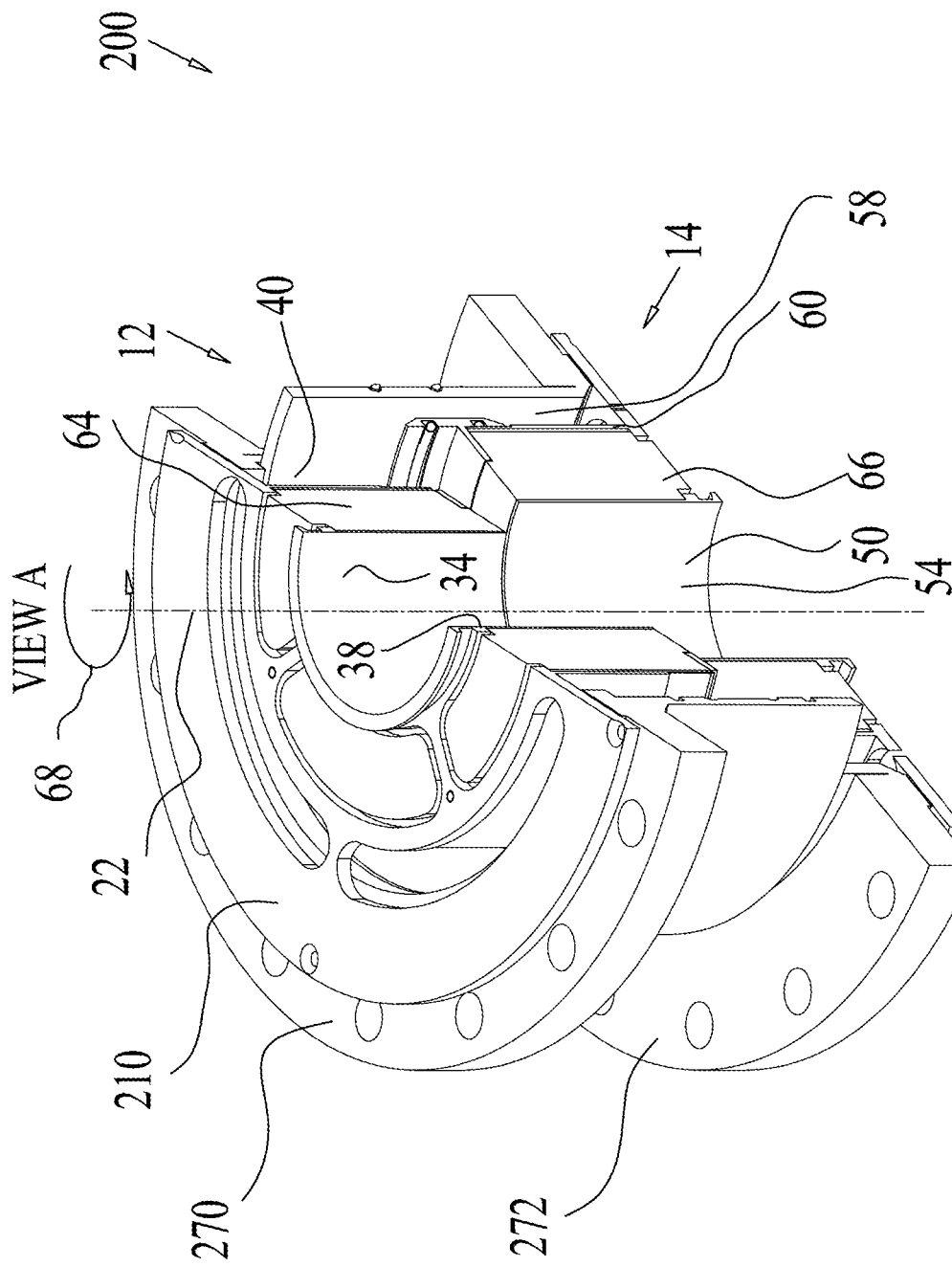
FIG. 5B is a simplified partially pictorial, partially sectional illustration shown in the orientation of arrow A in FIG. 5A.

Reference is now made to FIGS. 3-5B, which is a simplified pictorial illustration of a pipe coupling assembly constructed and operative in accordance with another embodiment of the present invention, a simplified sectional illustration taken along lines IVA-IVA in FIG. 3, a simplified sectional illustration taken along lines IVB-IVB in FIG. 3 showing an alternative embodiment of a sealing member, a simplified sectional illustration taken along lines IVC-IVC in FIG. 3, showing another alternative embodiment of a sealing member, a simplified partially pictorial, partially sectional illustration taken along lines VA-VA in FIG. 3, and a simplified partially pictorial, partially sectional illustration shown in the orientation of arrow A in FIG. 5A, respectively.

As seen in FIGS. 3 and 4A, a pipe coupling assembly 200 may comprise a plate 210 engaged with the first portion 12 and an oppositely facing plate 212 engaged with the second portion 14. The plates 210 and 212 may each be formed with a central aperture 220. Inner peripheral crescent-like shaped apertures 224 and peripheral crescent-like shaped apertures 228 may be annularly arranged about the central aperture 220.

Figure 6:
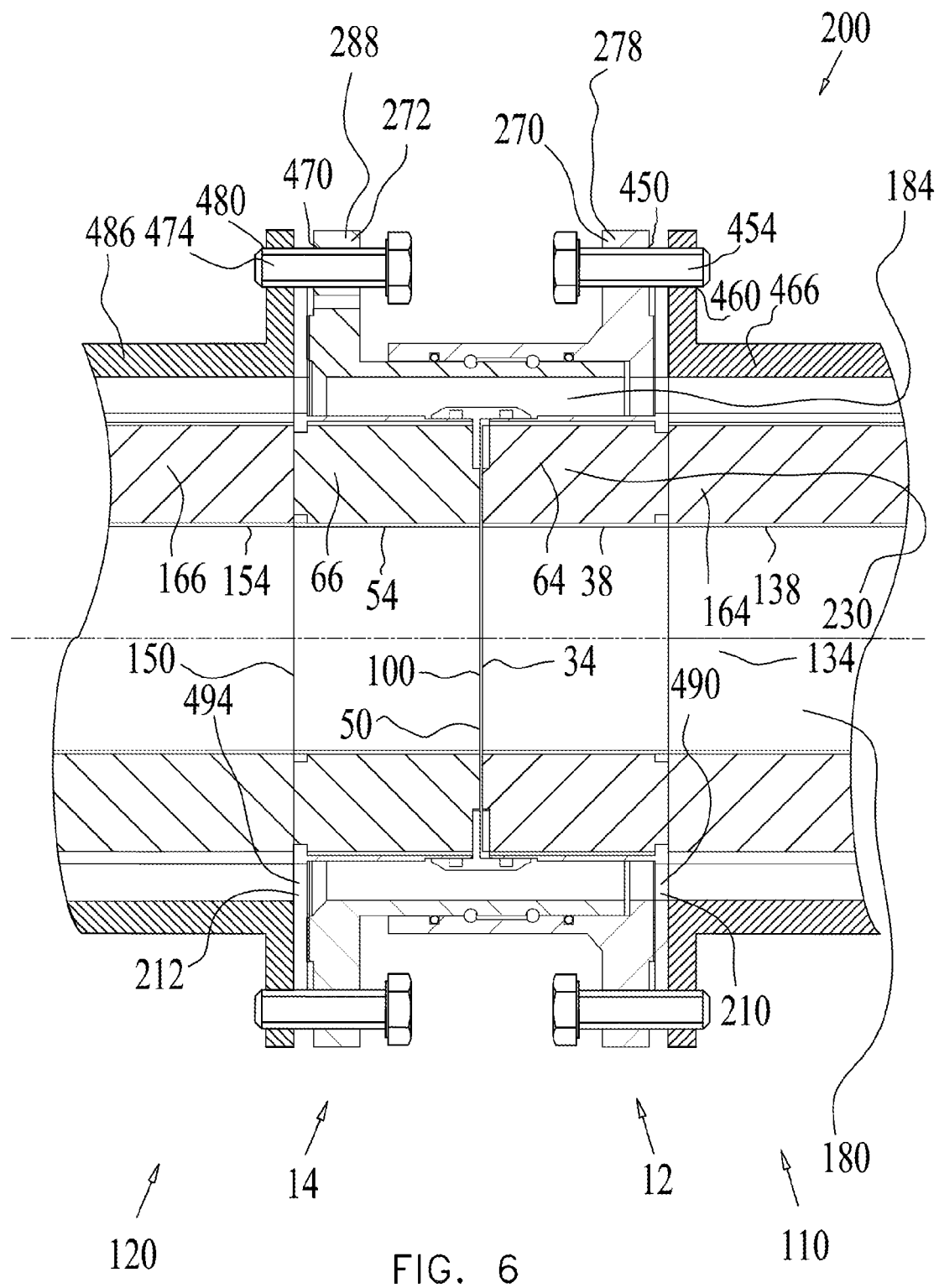
FIG. 6 is a simplified sectional illustration showing the pipe coupling assembly of FIGS. 4A, 5A and 5B adjoining pipe assemblies therein.

The central aperture 220 of plate 210 may be placed over the first channel 34 of first portion 12 and the central aperture 220 of plate 212 may be placed over the first channel 50 of second portion 14. A fluid flowing within first channels 34 and 50 of the pipe coupling assembly 200 may flow into or from the first channels 134 and 150 of respective first pipe assembly 110 and second pipe assembly 120, via central aperture 220 of plate 210 and 212. Thus, the generally continues first fluid channel 180 may be defined by the first channels 134, 34, 50 and 150 of respective first pipe assembly 110, first portion 12, second portion 14 and second pipe assembly 120, in virtue of the central aperture 220, that allows fluid communication between the pipe coupling assembly 200 and the first pipe assembly 110 and/or the second pipe assembly 120 (FIG. 6).

The outer apertures 228 of plate 210 may be placed over the second channel 40 of first portion 12 and the outer apertures 228 of plate 212 may be placed over the second channel 58 of second portion 14. A fluid flowing within second channels 40 and 58 of the pipe coupling assembly 200 may flow into or from the second channels 140 and 158 of respective first pipe assembly 110 and second pipe assembly 120, via outer apertures 228 of plate 210 and 212. Thus, the generally continues second fluid channel 184 may be defined by the second channels 140, 40, 58 and 158 of respective first pipe assembly 110, first portion 12, second portion 14 and second pipe assembly 120, in virtue of the outer apertures 228, that allow fluid communication between the pipe coupling assembly 200 and the first pipe assembly 110 or the second pipe assembly 120 (FIG. 6).

The inner apertures 224 of plate 210 may be placed over the thermal insulation 64 of first portion 12 and the inner apertures 224 of plate 212 may be placed over the thermal insulation 66 of second portion 14. Thus, a generally continues layer of thermal insulation 230 may defined by the thermal insulation 164, 64, 66 and 166 of respective first pipe assembly 110, first portion 12, second portion 14 and second pipe assembly 120 in virtue of the inner apertures 224, that allow engagement of the thermal insulation 64 of first portion 12 with thermal insulation 164 of first pipe assembly 110 and engagement of the thermal insulation 66 of second portion 14 with thermal insulation 166 of second pipe assembly 120 (FIG. 6).

The central aperture 220 may be formed as a single generally circular shaped aperture, as seen in FIG. 3. Alternatively, the central aperture 220 may be formed of a plurality of apertures (not shown) configured to allow fluid communication between the pipe coupling assembly 200 and the first pipe assembly 110 and/or the second pipe assembly 120.

The inner apertures 224 may be configured in any suitable manner so as to allow the thermal insulation 64 and 66 of the pipe coupling assembly 200 to be engaged with respective thermal insulation 164 and 166 of the first pipe assembly 110 and/or the second pipe assembly 120 (FIG. 6). For example, the inner apertures 224 may be formed as a single peripheral aperture (not shown). Alternatively, the inner apertures 224 may comprise a plurality of apertures, such as less or more than the four apertures shown in FIG. 3.

The outer apertures 228 may be configured in any suitable manner so as to allow fluid communication between the pipe coupling assembly 200 and the first pipe assembly 110 and/or the second pipe assembly 120 (FIG. 6). For example, the outer apertures 228 may be formed as a single peripheral aperture (not shown). Alternatively, the outer apertures 228 may comprise a plurality of apertures, such as less or more than the four apertures shown in FIG. 3.

As seen in FIG. 3, an inner annular ring 240 may be formed around central aperture 220 and an outer annular ring 244 may be formed between the inner apertures 224 and outer apertures 228. A plurality of inner radial arms 250 may connect the inner annular ring 240 to the outer annular ring 244. A plurality of outer radial arms 256 may connect the outer annular ring 244 to a rim 258 of the plate 210 or 212.

The inner annular ring 240, outer annular ring 244, inner arms 250 and/or outer arms 256 may provide rigidity to plates 210 and 212.

As seen in FIGS. 3 and 4A, the conduit 38 of the first portion 12 may protrude from the inner annular ring 240 of plate 210. Similarly, the conduit 54 of the second portion 14 may protrude from the inner annular ring 240 of plate 212.

The first wall 46 of conduit 44 of the first portion 12 may protrude from the outer annular ring 244 of plate 210. Similarly, the first wall 62 of conduit 60 of the second portion 14 may protrude from the outer annular ring 244 of plate 212.

The plates 210 and 212 may be formed of any suitable material, such as stainless steel, carbon steel, or aluminum, for example.

The inner arms 250 may be asymmetrically arranged relative to the outer arms 256. The inner apertures 224 may be asymmetrically arranged relative to the outer apertures 228. This asymmetric arrangement may be provided to at least partially prevent leakage of fluid flowing from first channels 34 and 50 to the second channels 40 and 58 or vise versa.

It is further noted that plates 210 and 212 may be obviated.

The pipe coupling assembly 200 may comprise a housing 260. Housing 260 may be formed in any suitable manner. In the embodiment of FIGS. 3-9 the housing may comprise a first tubular element 270 which may partially overlap and may be slidably engaged with a second tubular element 272. The second tubular element 272 may define the second wall 63 of the conduit 60 of the second portion 14 and the second tubular element 272 along with a portion of the first tubular element 270 may define the second wall 48 of the conduit 44 of the first portion 12.

The first tubular element 270 may be formed with a tubular portion 276 which may protrude from a flange 278 of first tubular element 270. The second tubular element 272 may be formed with a tubular portion 286 which may protrude from a flange 288 of second tubular element 272.

The tubular portion 276 may be designed to rotate relative to the tubular portion 286 in any suitable manner. In a non limiting example, as seen in FIGS. 4A-4C, a plurality of balls 290 may be provided within two spaced apart annular recesses 292 formed within the tubular portions 276 and 286. Similarly to a ball bearing type of mechanism, these balls 290 may allow the first tubular element 270 to rotate relative to the second tubular element 272. Additionally, these balls 290 may allow the first tubular element 270 to rotate relative to the second tubular element 272 while aligning the first tubular element 270 with the second tubular element 272.

It is noted that a single recess may be provided for the balls 290. Additionally, any suitable type of rolling element may be provided to allow the tubular portion 276 to rotate relative to the tubular portion 286.

A space 300 may be defined between recesses 292. The space 300 may be designated to receive a bearing lubricant therein.

It is noted that the bearing lubricant may be obviated.

The housing 260 may be formed in any suitable manner.

The tubular portion 276 along with the tubular portion 286 may form together two spaced apart annular recesses 310 provided to house any suitable sealing members, such as O-rings 312 therein.

It is noted that the O-rings 312 and balls 290 may be obviated.

Figure 7:
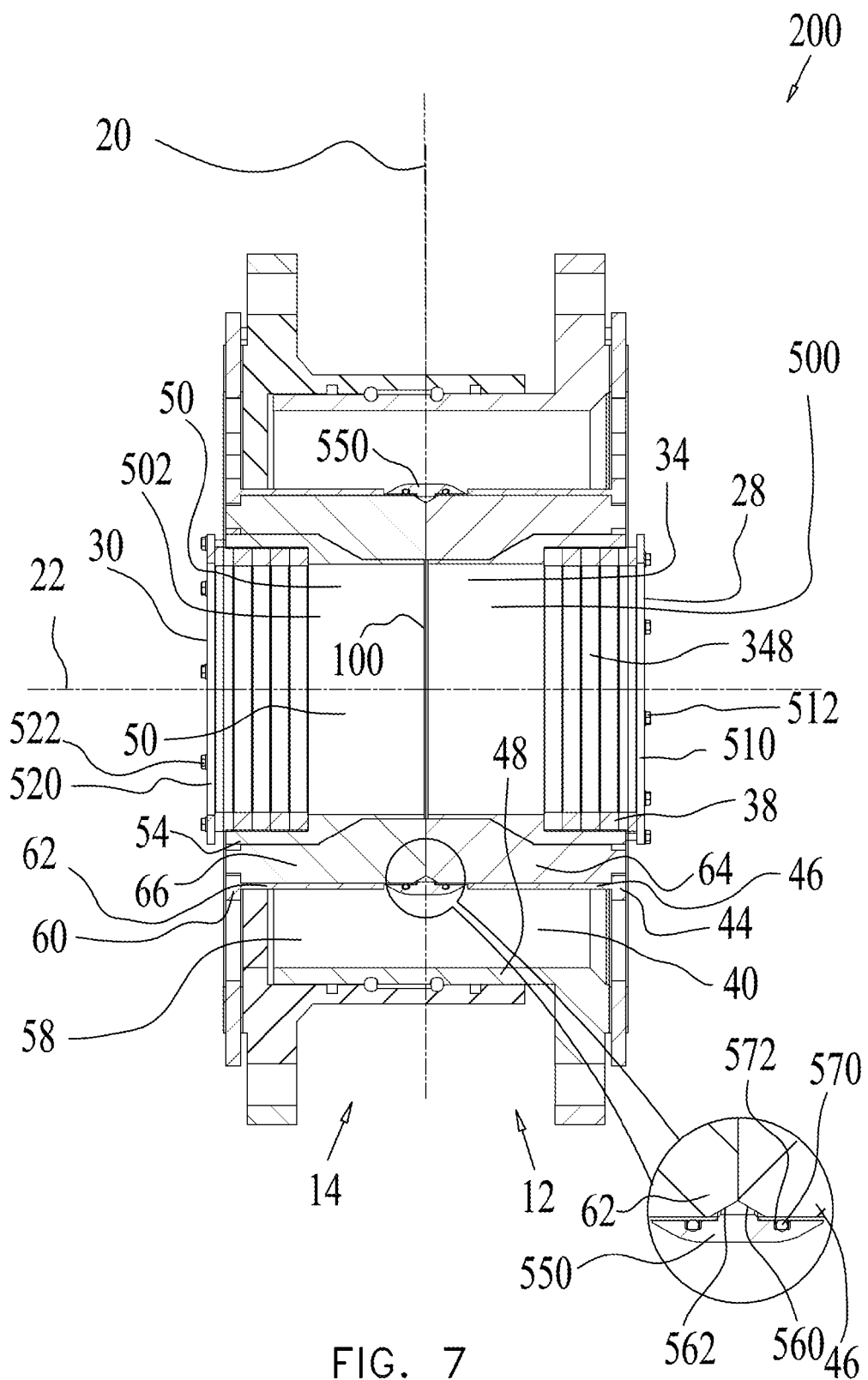
FIG. 7 is a simplified sectional illustration taken along lines VII-VII in FIG. 3, showing an alternative embodiment of the pipe coupling assembly of FIGS. 4A-6.
Figure 8:
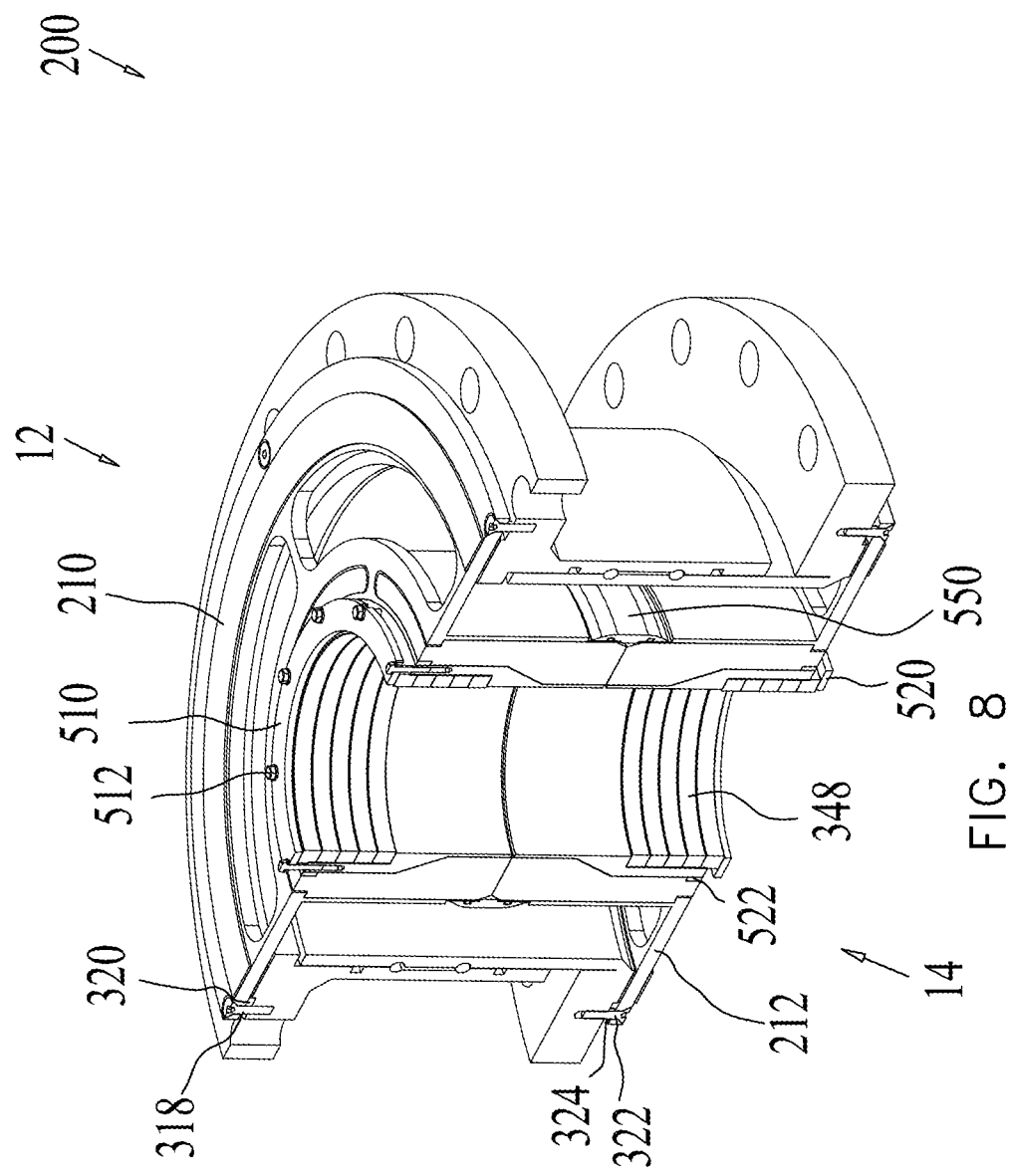
FIG. 8 is a simplified partially pictorial, partially sectional illustration of the pipe coupling assembly shown in FIG. 7, taken along lines VIII-VIII in FIG. 3.

In the embodiment shown in FIGS. 3-9, the first tubular element 270 may be connected to the plate 210 in any suitable manner. For example, the plate may be welded or adhered by epoxy or fixed in any suitable manner. Additionally, the plate 210 may be fixed to the first tubular element 270 by bolts 318 inserted within recesses 320 (FIG. 8).

The second tubular element 272 may be connected to the plate 212 in any suitable manner. For example, the plate may be welded or adhered by epoxy or fixed in any suitable manner. Additionally, the plate 212 may be fixed to the first tubular element 272 by bolts 322 inserted within recesses 324 (FIG. 8).

As described hereinabove, the conduit 38 and the first wall 46 of the first portion 12 and the conduit 54 and the first wall 62 of the second portion 14 may protrude from respective plates 210 and 212. Connecting the first tubular element 270 to the plate 210 and the second tubular element 272 to the plate 212 allows for rotating the first portion 12 relative to the second portion 14, or vise versa, by rotating the first tubular element 270 about the second tubular element 272, or vise versa. Additionally, the conduit 38 and the first wall 46 of the first portion 12 may be aligned with the conduit 54 and the first wall 62 of the second portion 14 due to the balls 290, which may be provided to maintain the alignment of the first tubular element 270 with the second tubular element 272, as described hereinabove.

Moreover, due to the ball bearing type of mechanism connecting the first tubular element 270 to the second tubular element 272, the substantial alignment of the first channel 34 with first channel 50 and the substantial alignment of second channel 40 with second channel 58 may be maintained, while the first portion 12 is rotated relative to the second portion 14, or vise versa. Furthermore, the substantially coaxial alignment of the first channels 34 and 50 with second channels 40 and 58 may be maintained, while the first portion 12 is rotated relative to the second portion 14, or vise versa.

It is appreciated that any suitable mechanism may be provided to maintain the substantial alignment of the first channel 34 with first channel 50 and the substantial alignment of second channel 40 with second channel 58 while the first portion 12 is rotated relative to the second portion 14, or vise versa. Additionally, it is appreciated that any suitable mechanism may be provided to maintain the substantially coaxial alignment of the first channels 34 and 50 with second channels 40 and 58 while the first portion 12 is rotated relative to the second portion 14, or vise versa.

A circumferential element 330 may be engaged with second channels 40 and 58 of respective first portion 12 and second portion 14. The circumferential element 330 may comprise a circumferential band 332 which may be seated within annular recesses 333 and 334. Recess 333 may be formed within the first wall 46 of conduit 44 of the first portion 12 and may extend from the gap 100 to underlie a first edge 336 of the circumferential band 332. Recess 334 may be formed within the first wall 62 of conduit 60 of the second portion 14 and may extend from the gap 100 to underlie a second edge 338 of the circumferential band 332.

A circumferential projection 340 may protrude from the circumferential band 332 into the insulation 66 of the second portion 14. The projection 340 may be provided to secure the insulation 66 intermediate the conduit 54 and the first wall 62 of conduit 60. A circumferential ring 342 may be provided substantially adjacent to the projection 340 at an opposite side of the gap 100. The ring 342 may be provided to secure the insulation 64 intermediate the conduit 38 and the first wall 46 of conduit 44.

The insulation 64 and 66 of respective first and second portions 12 and 14 may be secured in any suitable manner. As will be described with reference to FIGS. 7-9, the projection 340 and ring 342 may be obviated. For example, a securing element, such as a cord 348 (FIGS. 7-9) may be inserted with the first channels 34 and 50 of respective first portion 12 and second portion 14, thereby securing the insulation 64 intermediate the first channel 34 and the second channel 40 and securing the insulation 66 intermediate the first channel 50 and the second channel 58.

The circumferential element 330 may be formed of any suitable material, such as a ceramic material, an insulating material or a metal, such as carbon steel, stainless steel or aluminum, for example.

The circumferential element 330 may be engaged with second channels 40 and 58 of respective first portion 12 and second portion 14 in any suitable manner. For example, the circumferential projection 340 may be fixed to the first wall 62 of the conduit 60 by thoroughgoing bolts (not shown) inserted within the circumferential element 330, the first wall 62 and the insulation 66. Alternatively, the circumferential element 330 may be adhered by epoxy or connected to the insulation 66 in any suitable manner.

The ring 342 may be engaged with the insulation 64 in any suitable manner. For example, the ring 342 may be fixed to the insulation 64 by thoroughgoing bolts (not shown) inserted within the ring 342 and the insulation 64. Alternatively, the ring 342 may be adhered by epoxy or connected to the insulation 64 in any suitable manner.

Sealing functionality, comprising a sealing member, may be provided to prevent leakage of fluid intermediate the first channels 34 and 50 and the second channels 40 and 58.

The sealing member may be any suitable element provided to prevent leakage of fluid intermediate the first channels 34 and 50 and the second channels 40 and 58.

For example, in the embodiment shown in FIGS. 4A and 7-9 the sealing member may be an O-ring 350. The O-ring 350 may be inserted within each of two spaced apart annular cavities 356, which may be formed within the circumferential band 332. It is noted that the O-ring 350 may be placed in any suitable location within the pipe coupling assembly 200.

The O-ring 350 may be formed of any suitable material, such as a material configured to withstand relatively high temperatures. In a non-limiting example, the O-ring 350 may be formed of perfluoroelastomer and may be commercially available under the tradename Kalrez® from DuPont Performance Polymers of 4417 Lancaster Pike Wilmington, Del., USA.

Turning to FIG. 4B, an alternative sealing member is shown. This sealing member may comprise a lip seal 380. The lip seal 380 may comprise a biasing element 384 comprising any suitable spring 388 therewithin. The biasing element 384 may be formed with a protrusion 390. Upon placing the lip seal 380 within the pipe coupling assembly 200, the spring 388 may urge the biasing element 384 to be biased towards the gap 100 so as to insert the protrusion 390 within the gap 100. The inserted protrusion 390 may seal the gap 100 and thereby prevent flow of fluid or leakage of fluid intermediate the first channels 34 and 50 and the second channels 40 and 58.

The lip seal 380 may be placed in any suitable location within the pipe coupling assembly 200, such as on the gap 100, as seen in FIG. 4B. Alternatively, the lip seal 380 may be inserted within the cavities 356 of circumferential element 330 in place of the O-rings 350 (FIG. 4A).

As seen in FIGS. 4A and 4B the sealing member, such as the O-ring 350 of FIG. 4A or the lip seal 380 of FIG. 4B, may be placed upon the first walls 46 and 62 of respective conduits 44 and 60. This allows for the sealing member to be in a relatively low temperature environment of the second channels 40 and 58 of respective first and second portion 12 and 14. Thus the sealing member may not be subjected to thermal stresses in the relatively high temperature environment of the first channels 34 and 50 of respective first and second portion 12 and 14. It is noted that the sealing member may be placed at any suitable location within the pipe coupling assembly 200.

As seen in FIG. 4C, the gap 100 may be designed with an incline 400 at a peripheral section 404 thereof. The peripheral section 404 may be defined intermediate insulation 64 of first section 12 and insulation 66 of second section 14. The peripheral section 404 may extend from a generally longitudinal section 408 defined intermediate first channel 34 of first section 12 and first channel 50 of second section 14.

The peripheral section 404 may be formed in any suitable orientation for minimizing flow of fluid intermediate the first channels 34 and 50 and the second channels 40 and 58. For example, as seen in FIG. 4C, the peripheral section 404 may extend from the central axis 20 towards the surface 30 of the second portion 14. The incline 400 of the peripheral section 404 may be at an angle diverging from the central axis 20 towards an orientation generally parallel to an orientation of fluid flowing within the first channels 34 and 50, as illustrated by arrow 420.

It is noted that in addition to the inclined gap of FIG. 4C the sealing members, such as the O-rings 350 of FIG. 4A and/or the lip seal 380 of FIG. 4B may be provided or any other suitable sealing member or sealing functionality.

Additionally, the gap 100 may be formed with complementary grooves (not shown) for minimizing flow of fluid intermediate the first channels 34 and 50 and the second channels 40 and 58.

It is appreciated that the gap 100 may be formed in any suitable configuration that at least partially blocks or constricts the fluid flow intermediate the first channels 34 and 50 to the second channels 40 and 58.

Turning to FIGS. 5A and 5B, the first portion 12 is shown rotated relative to the second portion 14 in the orientation illustrated by arrow 68. It can be seen that while the first and second portions are rotated relative to each other the first channel 34 of portion 12 is substantially aligned with the first channel 50 of portion 14 and the second channel 40 of portion 12 is substantially aligned with the second channel 58 of portion 14. Additionally, the substantially coaxial alignment of the first channels 34 and 50 with second channels 40 and 58 is shown to be maintained, while the first portion 12 is rotated relative to the second portion 14.

Reference is now made to FIG. 6, which is a simplified sectional illustration showing the pipe coupling assembly of FIGS. 3, 4A, 5A and 5B adjoining pipe assemblies therein. As seen in FIG. 6, on the first flange 278 of the first tubular element 270 may be formed a plurality of annularly arranged throughgoing bores 450. A bolt 454 may be inserted within each bore 450 and in a corresponding bore 460 of a flange 466 of the first pipe assembly 110, thereby mounting the pipe coupling assembly 200 to the first pipe assembly 110.

Similarly, on the second flange 288 of the second tubular element 272 may be formed a plurality of annularly arranged throughgoing bores 470. A bolt 474 may be inserted within each bore 470 and in a corresponding bore 480 of a flange 486 of the second pipe assembly 120, thereby mounting the pipe coupling assembly 200 to the second pipe assembly 120.

The pipe coupling assembly 200 may be connected to respective first or second pipe assemblies 110 and 120 in any suitable manner.

Gaskets (not shown) may be provided intermediate the pipe coupling assembly 200 and the first pipe assembly 110 and/or the second pipe assembly 120 so as to ensure the alignment of the pipe coupling assembly 200 to the first pipe assembly 110 and/or to the second pipe assembly 120. The gaskets may be placed in any suitable location, such as on a surface 490 of the plate 210 and/or the surface 494 of the plate 212. Surfaces 490 and 494 are shown to face respective first and second pipe assemblies 110 and 120.

It is appreciated that any suitable element may be provided intermediate the pipe coupling assembly 200 and the first pipe assembly 110 and/or the second pipe assembly 120 to ensure continues fluid flow via first and second fluid channels 180 and/or 184.

It is appreciated that the pipe coupling assembly 200 may be utilized to adjoin any pipes or pipe assemblies configured in any suitable manner.

The pipe coupling assembly 200 may be utilized to adjoin pipe assemblies within a fluid transfer system. The fluid transfer system may be utilized to transfer a single fluid or a plurality of fluids therein.

Reference is now made to FIGS. 7 and 8, which is a simplified sectional illustration taken along lines VII-VII in FIG. 3, showing an alternative embodiment of the pipe coupling assembly of FIGS. 4A-6, a simplified partially pictorial, partially sectional illustration of the pipe coupling assembly shown in FIG. 7, taken along lines VIII-VIII in FIG. 3, respectively.

As seen in FIGS. 7 and 8, a pipe coupling assembly 200 may be formed with a supporting element, which may be provided to support and secure the conduits 38 and 54 and thereby the insulation 64 and 66 of respective first and second portions 12 and 14. The supporting element may comprise the cord 348 or any other suitable element. The cord 348 may be configured in any suitable configuration, such as with a circular or rectangular cross section, for example. The cord 348 may be formed of any suitable material, such as a ceramic material. In a non-limiting example, the cord 348 may comprise a braided ceramic rope, such as a Square Braid CeraTex Ceramic Fiber Rope commercially available at Ceramic Fiber.Net of Mineral Seal Corp. 1832 S. Research Loop Tucson, Ariz., USA.

The cord 348 may be placed in any suitable location within the pipe coupling assembly 200. As seen in FIGS. 7 and 8, the cord 348 may be inserted within the first channel 34 of first portion 12 and may be coiled up and against the conduit 38. The cord 348 may extend from the surface 28 of first portion 12 to a generally midsection 500 of the conduit 38. It is noted that the cord 348 may extend from the surface 28 to the gap 100.

The cord 348 may, additionally or alternatively, be inserted within the first channel 50 of second portion 14 and may be coiled up and against the conduit 54. The cord 348 may extend from the surface 30 of second portion 14 to a generally midsection 502 of the conduit 54. It is noted that the cord 348 may extend from the surface 30 to the gap 100.

The cord 348 may be attached to the pipe coupling assembly 200 in any suitable manner. For example, a ring 510 may be placed upon surface 28. The ring 510 may be bolted to the conduit 38 by bolts 512. The ring 510 presses upon the cord 348, thereby securing the cord 348 to the conduit 38. In turn, the conduit 38 presses upon the insulation 64, thereby securing the insulation 64 intermediate the conduit 38 and the first wall 46 of the conduit 44.

Additionally or alternatively, a ring 520 may be placed upon surface 30. The ring 520 may be bolted to the conduit 54 by bolts 522. The ring 520 presses upon the cord 348, thereby securing the cord 348 to the conduit 54. In turn, the conduit 54 presses upon the insulation 66, thereby securing the insulation 66 intermediate the conduit 54 and the first wall 62 of the conduit 60.

An annular sealing housing 550 may be may be engaged with second channels 40 and 58 of respective first portion 12 and second portion 14. The sealing housing 550 may be seated within annular grooves 560 and 562. Grooves 560 and 562 may be formed, respectively, within the first wall 46 of conduit 44 of the first portion 12 and within the first wall 62 of conduit 60 of the second portion 14. The grooves 560 and 562 may be formed in any suitable configuration. As seen in FIGS. 7 and 8 the grooves 560 and 562 may form together a triangular-like shaped groove provided to allow the sealing housing 550 to be seated therein.

The sealing housing 550 may be formed of any suitable material, such as a ceramic material, an insulating material or a metal, such as carbon steel, stainless steel or aluminum, for example.

An O-ring 570 may be inserted within each of two spaced apart annular cavities 572, which may be formed within the sealing housing 550. It is noted that the O-ring 570 may be placed in any suitable location within the pipe coupling assembly 200.

The O-ring 570 may be formed of any suitable material, such as a material configured to withstand relatively high temperatures. In a non-limiting example, the O-ring 570 may be formed of perfluoroelastomer and may be commercially available under the tradename Kalrez® from DuPont Performance Polymers of 4417 Lancaster Pike Wilmington, Del., USA.

It is noted that the other elements of the pipe coupling assembly 200 of FIGS. 7 and 8 may be substantially similar to the elements of the pipe coupling assembly 200 of FIGS. 4A-6.

Figure 9:
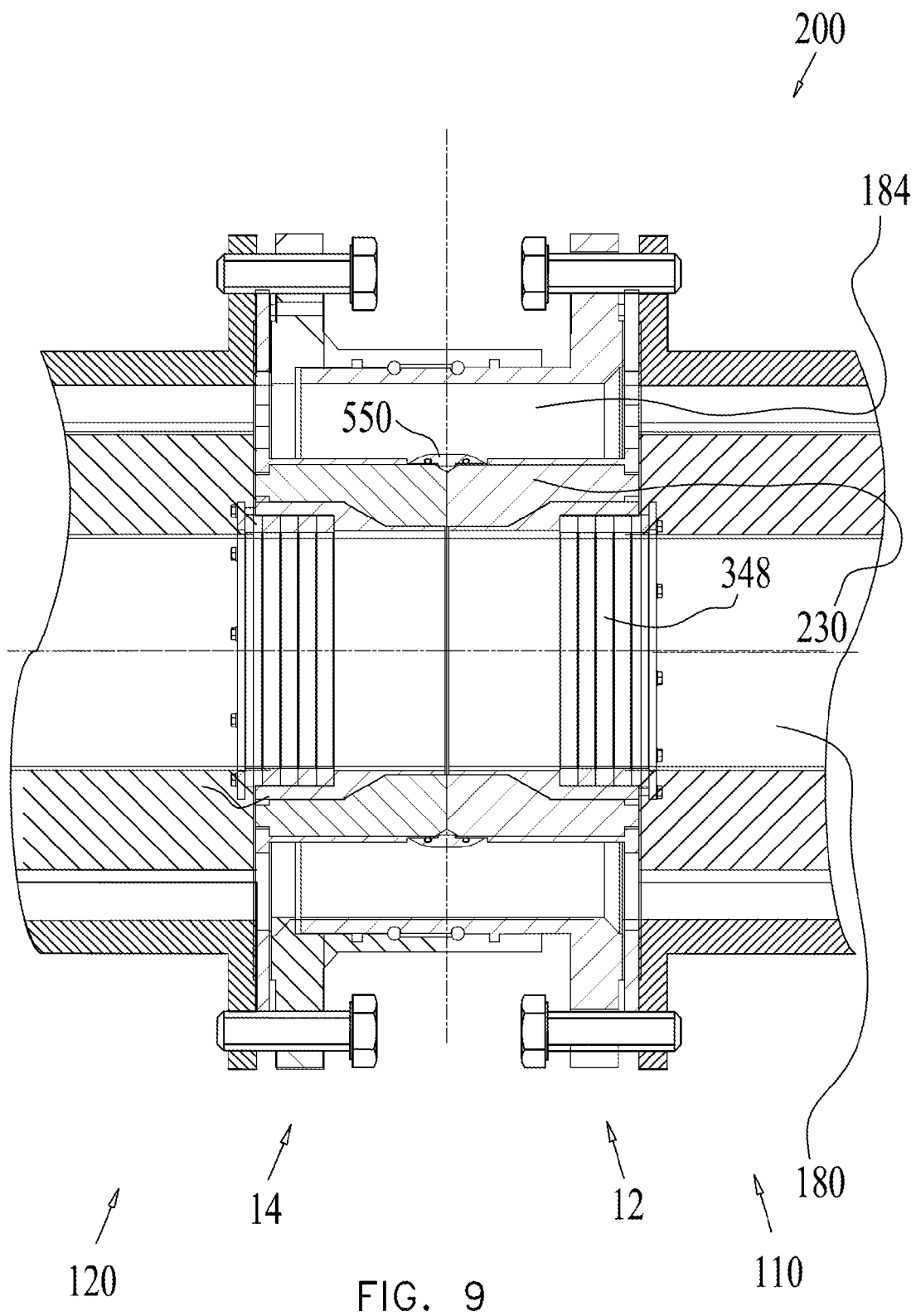
FIG. 9 is a simplified sectional illustration showing the pipe coupling assembly of FIGS. 7 and 8 adjoining pipe assemblies therein.

Reference is now made to FIG. 9, which is a simplified sectional illustration showing the pipe coupling assembly of FIGS. 7 and 8 adjoining pipe assemblies therein. As seen in FIG. 9, the pipe coupling assembly 200 may couple the first pipe assembly 110 to the second pipe assembly 120. The first pipe assembly 110 and the second pipe assembly 120 may be coupled to the pipe coupling assembly 200 in any suitable manner, such as shown in reference to the pipe coupling assembly 200 of FIG. 6, for example.

Figure 10:
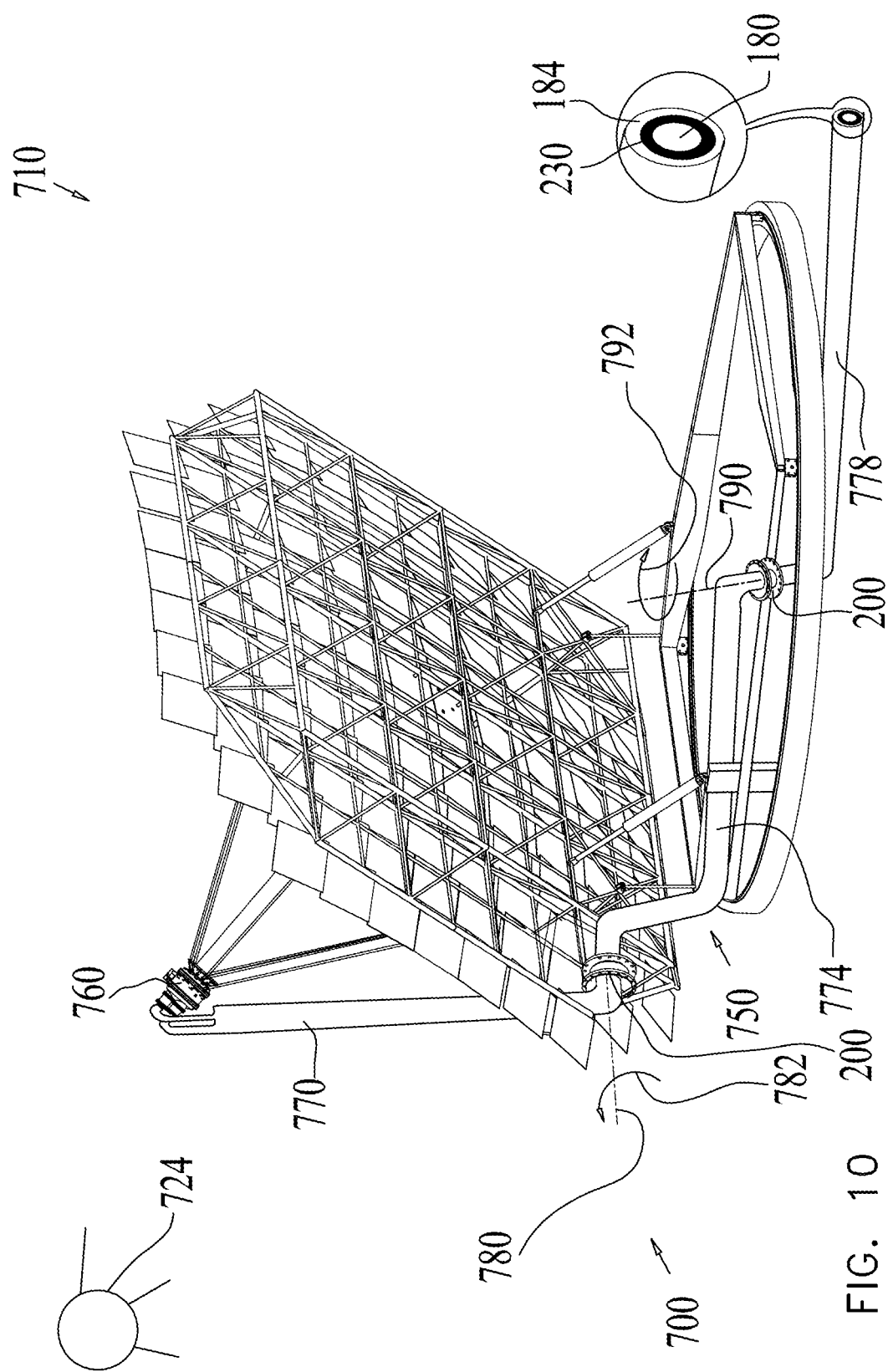
FIG. 10 is a simplified pictorial illustration of a pipe coupling assembly within a fluid transfer system.

Reference is now made to FIG. 10, which is a simplified pictorial illustration of the pipe coupling assembly within a fluid transfer system. In a non-limiting example, the fluid transfer system may be used to transfer a fluid to be heated within a thermal energy generation system and thereafter provide thermal energy of the now heated fluid to a thermal energy consumption system. The thermal energy generation system may be any suitable thermal energy generation system operative to heat a fluid. For example, the thermal energy generation system may comprise a fossil-fuel based system, an electrical power system or a renewable energy system. Examples of renewable energy systems are solar energy systems, geothermal energy systems, wind or wave energy systems. In the embodiment shown in FIG. 10, the thermal energy generation system comprises a solar energy system, which may be any suitable solar concentrating system. The solar concentrating system is operative to heat the fluid flowing within the solar concentrating system, by concentrated solar radiation impinging upon the fluid.

Any suitable fluid may flow within the solar concentrating system, such as a gas, typically air, helium or carbon dioxide, or a liquid such as oil, water, an organic fluid or molten salt, for example.

It is appreciated that the solar concentrating system may be any suitable solar concentrating system, such as a solar tower energy system, a Fresnel lens solar energy system, a trough-Fresnel mirror solar energy system, a linear Fresnel solar energy system, a solar heliostat concentrating energy system or a parabolic trough solar concentrating energy system, for example.

As seen in FIG. 10, a fluid transfer system 700 is shown within a solar concentrating system 710.

The solar concentrating system 710 may be designed to track the sun 724 in any suitable orientation.

Generally, an unheated fluid, such as the fluid described in reference to FIGS. 1-9 hereinabove, flows within the second fluid channel 184, defined within a plurality of pipes 750 of the fluid transfer system 700. The unheated fluid may be heated in any suitable manner, such as by concentrated light impinging upon a solar receiver 760. The now heated fluid, flows within the first fluid channel 180 defined within pipes 750.

The heated fluid exiting the first fluid channel 180 may be provided to any thermal energy consumption system (not shown) wherein the thermal energy of the heated fluid is utilized.

The pipes 750 may be configured as a series of adjoined pipes comprising a first pipe 770. A second pipe 774 may be coupled to first pipe 770 via the pipe coupling assembly 200. The pipe coupling assembly 200 allows for the rotational movement of the first pipe 770 relative to second pipe 774 about its central longitudinal axis 780 in the orientation of arrow 782. The second pipe 774 may be coupled to a third pipe 778 via a pipe coupling assembly 200. The pipe coupling assembly 200 allows for the rotational movement of the second pipe 774 relative to the third pipe 778 about its central longitudinal axis 790 in the orientation of arrow 792.

It is noted that the respective first, second and third pipes 770, 774 and 778 may comprise any one of the first or second pipe assemblies of FIGS. 1-9.

As seen in FIG. 10, the pipe coupling assembly 200 may be connected to a pipe assembly at one end thereof and another pipe coupling assembly 200 may be connected to a pipe assembly at another end thereof.

The pipe coupling assembly 200 described in reference to FIG. 10 may comprise any one of the pipe coupling assemblies described in reference to FIGS. 3-9. Additionally, the pipe coupling assembly 10 of FIGS. 1 and 2 may be used within the fluid transfer system 700 of FIG. 10.

It is appreciated that any suitable configuration of series of pipes 750 may be employed so as to transfer the fluid within the fluid transfer system 700.

It is further noted that the pipe coupling assembly 10 or 200 may be utilized to adjoin a first pipe assembly 110 to a second pipe assembly 120 so as to allow a fluid to flow within any fluid transfer system. In a non-limiting example, the fluid transfer system may be utilized for transferring oil from an oil field, or transferring a combustion gas.

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art.

What is claimed is:

1. A pipe coupling assembly, comprising:
   a first portion having a first channel therethrough and a second channel substantially coaxial with and separated from said first channel; and
   a second portion rotatably connected to said first portion, wherein said second portion has a first channel substantially aligned with said first channel of said first portion and a second channel substantially aligned with said second channel of said first portion,
   the pipe coupling assembly being configured to couple a pipe assembly to another pipe assembly,
   at least one of said pipe assembly and another pipe assembly comprising:
      a first pipe assembly channel; and
      a second pipe assembly channel coaxial with and separated from said first pipe assembly channel,
   said pipe coupling assembly being configured for alignment of said second pipe assembly channel of said pipe assembly to said second pipe assembly channel of said another pipe assembly, for allowing a fluid to flow substantially continuously through the second pipe assembly channel of said pipe assembly to said second pipe assembly channel of said another pipe assembly, via the second channel of the first and second portions of the pipe coupling assembly; wherein thermal insulation is provided intermediate said first channels of said first and second portion and said second channels of said first and second portion.

2. A pipe coupling assembly according to claim 1 further comprising a sealing member for preventing leakage of a fluid intermediate said first channels of said first and second portion to said second channels of said first and second portion.

3. A pipe coupling assembly according to claim 2 wherein said sealing member is positioned within said second channel of said first portion and/or second channel of said second portion.

4. A pipe coupling assembly according to claim 2 wherein said sealing member comprises an O-ring.

5. A pipe coupling assembly according to claim 2 wherein said sealing member comprises a lip seal.

6. A pipe coupling assembly according to claim 1 wherein a gap is defined intermediate said first portion and said second portion, said gap comprising a substantially inclined portion.

7. A pipe coupling assembly according to claim 1 wherein said second portion is rotatably connected to said first portion utilizing a ball bearing type of mechanism.

8. A pipe coupling assembly according to claim 7 wherein said ball bearing type of mechanism is provided with a lubricant.

9. A pipe coupling assembly according to claim 1 wherein at least one rolling element is provided for rotatable connection of said second portion to said first portion.

10. A pipe coupling assembly according to claim 1 further comprising a supporting element provided to secure said thermal insulation to said pipe coupling assembly.

11. A pipe coupling assembly according to claim 10 wherein said supporting element comprises a cord.

12. A pipe coupling assembly according to claim 1 wherein said pipe coupling assembly is configured with at least one aperture for allowing fluid communication between said pipe coupling assembly and a channel of a pipe assembly.

13. A pipe coupling assembly according to claim 12 wherein said least one aperture includes a plurality of apertures formed in a crescent-like shape.

14. A pipe coupling assembly according to claim 13 wherein said plurality of apertures comprises a plurality of outer apertures, said plurality of outer apertures being annually arranged about a plurality of inner apertures.

15. A pipe coupling assembly according to claim 14 wherein said outer apertures are asymmetrically arranged about said inner apertures.

16. A pipe coupling assembly according to claim 13 wherein radial arms are defined intermediate at least one pair of said plurality of apertures.

17. A pipe coupling assembly according to claim 1 wherein said pipe coupling assembly is configured for alignment of said first pipe assembly channel of said pipe coupling assembly with said first pipe assembly channel of said another pipe assembly.

18. A pipe coupling assembly according to claim 1 wherein said pipe coupling assembly is connected to a pipe assembly at one end thereof and another said pipe coupling assembly is connected to said pipe assembly at another end thereof.

19. A pipe coupling assembly, comprising:
a first portion having a first channel therethrough;
a second channel substantially coaxial with and separated from said first channel;
a second portion rotatably connected to said first portion, wherein said second portion has a first channel substantially aligned with said first channel of said first portion and a second channel substantially aligned with said second channel of said first portion;
thermal insulation being provided intermediate said first channels of said first and second portion and said second channels of said first and second portion; and
a supporting element provided to secure said thermal insulation to said pipe coupling assembly, said supporting element comprising a cord.

20. A pipe coupling assembly, comprising:
a first portion having a first channel therethrough;
a second channel substantially coaxial with and separated from said first channel; and
a second portion rotatably connected to said first portion, wherein said second portion has a first channel substantially aligned with said first channel of said first portion and a second channel substantially aligned with said second channel of said first portion,
wherein said pipe coupling assembly is configured with at least one aperture for allowing fluid communication between said pipe coupling assembly and a channel of a pipe assembly,
wherein said least one aperture includes a plurality of apertures formed in a crescent-like shape, and
wherein said plurality of apertures comprises a plurality of outer apertures, said plurality of outer apertures being annually arranged about a plurality of inner apertures.

21. A pipe coupling assembly according to claim 20 wherein said outer apertures are asymmetrically arranged about said inner apertures.

* * * * *